United States Patent
Bech

(10) Patent No.: US 8,901,764 B2
(45) Date of Patent: Dec. 2, 2014

(54) METHOD FOR CONTROLLING A WIND FARM, WIND FARM CONTROLLER, WIND FARM, COMPUTER-READABLE MEDIUM AND PROGRAM ELEMENT

(71) Applicant: John Bech, Hammel (DK)

(72) Inventor: John Bech, Hammel (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/848,113

(22) Filed: Mar. 21, 2013

(65) Prior Publication Data

US 2013/0257050 A1    Oct. 3, 2013

(30) Foreign Application Priority Data

Mar. 27, 2012    (EP) ................................. 12161408

(51) Int. Cl.
*F03D 9/00*  (2006.01)
*H02P 9/04*  (2006.01)
*H02P 31/00*  (2006.01)
*H02J 9/08*  (2006.01)
*H02J 3/38*  (2006.01)
*G05D 3/12*  (2006.01)

(52) U.S. Cl.
CPC . *H02P 31/00* (2013.01); *H02J 9/08* (2013.01); *Y02B 10/72* (2013.01); *Y02E 10/763* (2013.01); *H02J 3/386* (2013.01); *Y02E 10/766* (2013.01)
USPC ............................... 290/44; 290/55; 700/287

(58) Field of Classification Search
CPC ........... H02J 3/386; H02J 3/382; H02J 11/00; Y02B 10/72; Y02B 70/3225; Y02E 10/763; Y02E 10/766; Y02E 10/563; Y02E 10/566; Y02E 10/725; Y02E 10/76; Y02E 10/723; F03D 7/047; F03D 7/048; F03D 7/0272; F03D 7/0284; F05B 2270/337; H02P 2009/004; H02P 9/04; H02P 9/007; H02P 9/10; Y04S 20/222; H02K 7/1838; H02K 7/183
USPC ........................................ 290/44, 55; 700/287
See application file for complete search history.

(56) References Cited

U.S. PATENT DOCUMENTS 4,976,587 A  * 12/1990  Johnston et al. ............... 416/230
6,563,234 B2 *  5/2003  Hasegawa et al. .............. 307/66
7,531,911 B2 *  5/2009  Rivas et al. ...................... 290/44

(Continued)

FOREIGN PATENT DOCUMENTS

EP          2101392 A2      9/2009
WO    WO 2011148503 A1    12/2011

OTHER PUBLICATIONS

Novel Integration of DFIG-Based Wind Generators Within Microgrids, Meghdad Fazeli et al "Novel Integration of DFIG-Based Wind Generators Within Microgrids", IEEE Transactions on Energy Conversion , vol. 26, No. 3, pp. 840-850, Sep. 1, 2011, US.

*Primary Examiner* — Pedro J Cuevas

(57) ABSTRACT

A method is provided for controlling a wind farm connected to a grid. The wind farm includes a wind farm emergency generator and at least a first wind turbine. The first wind turbine includes a wind turbine transformer, a wind turbine converter and auxiliary equipment. The method includes detecting a lost grid connection, providing active power to the auxiliary equipment via the wind farm emergency generator, providing reactive power via the wind turbine converter.

6 Claims, 1 Drawing Sheet

(56) References Cited

U.S. PATENT DOCUMENTS

| | | | |
|---|---|---|---|
| 7,679,215 B2* | 3/2010 | Delmerico et al. | 307/57 |
| 8,080,891 B2* | 12/2011 | Schramm et al. | 290/44 |
| 8,234,015 B2* | 7/2012 | Bech et al. | 700/292 |
| 8,247,917 B2* | 8/2012 | Yasugi et al. | 290/44 |
| 8,694,171 B2* | 4/2014 | Ichinose et al. | 700/287 |
| 8,710,689 B2* | 4/2014 | Letas | 290/55 |
| 8,718,832 B2* | 5/2014 | Hashimoto et al. | 700/287 |
| 8,736,093 B2* | 5/2014 | Kii et al. | 290/44 |
| 2001/0012211 A1* | 8/2001 | Hasegawa et al. | 363/131 |
| 2003/0015876 A1* | 1/2003 | Ichinose et al. | 290/44 |
| 2006/0132993 A1* | 6/2006 | Delmerico et al. | 361/20 |
| 2008/0150283 A1* | 6/2008 | Rivas et al. | 290/44 |
| 2010/0094474 A1* | 4/2010 | Larsen et al. | 700/287 |
| 2010/0133823 A1* | 6/2010 | Schramm et al. | 290/44 |
| 2011/0043186 A1* | 2/2011 | Bech et al. | 323/364 |
| 2011/0074151 A1* | 3/2011 | Burra et al. | 290/44 |
| 2011/0187106 A1* | 8/2011 | Ichinose et al. | 290/44 |
| 2011/0282503 A1* | 11/2011 | Sakanaka et al. | 700/287 |
| 2012/0061959 A1* | 3/2012 | Yasugi et al. | 290/44 |
| 2012/0242295 A1* | 9/2012 | Bech et al. | 322/87 |
| 2013/0038133 A1* | 2/2013 | Bech | 307/83 |
| 2013/0175799 A1* | 7/2013 | Prinz | 290/44 |
| 2013/0300118 A1* | 11/2013 | Bech | 290/44 |
| 2014/0035284 A1* | 2/2014 | Bech | 290/44 |
| 2014/0103656 A1* | 4/2014 | Azegami et al. | 290/44 |
| 2014/0152012 A1* | 6/2014 | Kim et al. | 290/44 |
| 2014/0191507 A1* | 7/2014 | Holmberg et al. | 290/44 |

* cited by examiner

METHOD FOR CONTROLLING A WIND FARM, WIND FARM CONTROLLER, WIND FARM, COMPUTER-READABLE MEDIUM AND PROGRAM ELEMENT

CROSS REFERENCE TO RELATED APPLICATIONS

This application claims priority of European Patent Office application No. 12161408.5 EP filed Mar. 27, 2012. All of the applications are incorporated by reference herein in their entirety.

FIELD OF INVENTION

The embodiments illustrated herein relate to the field of methods for controlling a wind farm. Moreover, the embodiments relate to a wind farm controller and a wind farm. Furthermore, the embodiments also relate to a computer-readable medium and a program element.

BACKGROUND OF INVENTION

Wind farms typically comprise several wind turbines connected to a grid, which on the one hand transports the produced energy to the consumers and on the other hand provides frequency, voltage and reactive power support. Generally, each wind turbine comprises a wind turbine transformer, a wind turbine converter, a wind turbine generator and auxiliary equipment, e.g. measuring equipment, strobe lights, yaw motors etc.

In case of a lost grid connection the auxiliary equipment has to be provided with power. It may, for example, be important that yaw motors can operate when the grid connection is lost. The yaw motors may, for example, rotate the nacelle of the wind turbine into a position, where the mechanical stresses are minimized. Accordingly, a central wind farm emergency generator is provided, which provides the required active power. However, it is necessary to energize the wind turbine transformers first. Hence, the wind farm emergency generator has to be capable of delivering a high amount of reactive power corresponding to the high inrush current to all of the transformers, too.

So far this problem has been solved by using a relative large diesel generator, which is adapted to deliver the inrush current to the all the transformers. However, in particular in case of offshore wind farms it may be difficult and costly to provide a platform for such a huge diesel generator.

Hence there may be a need for a method for controlling a wind farm, a wind farm controller, a wind farm, a computer-readable medium and a program element allowing for smaller wind farm emergency generators.

SUMMARY OF INVENTION

This need may be met by the subject matter according to the independent claims Example embodiments are described by the dependent claims.

According to a first aspect, there is provided a method for controlling a wind farm connected to a grid, wherein the wind farm comprises a wind farm emergency generator and at least a first wind turbine, wherein the first wind turbine comprises a wind turbine transformer, a wind turbine converter and auxiliary equipment, wherein the method comprises detecting a lost grid connection, providing active power to the auxiliary equipment via the wind farm emergency generator, providing reactive power via the wind turbine converter. For example, the wind turbine converter may be a frequency converter. In particular, the wind turbine converter may be a double fed and/or a full scale system.

All the elements required for performing said method are typically available in current wind farms. Hence, the method may be easily performed with existing wind farms.

According to a first exemplary embodiment of the method the wind farm further comprises a wind turbine switch for connecting a second wind turbine and the method further comprises closing the wind turbine switch for connecting the second wind turbine. The wind turbine switch may for example be located in the first wind turbine or in the second wind turbine.

Connecting the wind turbines one after the other may reduce reactive power demand peaks. Alternatively or in addition radials of wind turbines may be connected one after the other.

According to a further exemplary embodiment of the method providing reactive power via the wind turbine converter comprises providing reactive power for energizing a wind turbine transformer of the second wind turbine.

This embodiment may further reduce the reactive power that an emergency generator has to provide in case of a lost connection to the grid.

According to another exemplary embodiment of the method providing active power to the auxiliary equipment via the wind farm emergency generator comprises ramping up slowly a wind farm emergency generator voltage from zero to nominal.

This embodiment may enhance voltage stability.

According to a still further exemplary embodiment of the method the wind farm comprises a shunt reactor, in particular a variable shunt reactor and the method comprises compensating reactive power via the shunt reactor.

Hence, the reactive power loads on the wind farm emergency generator may be further reduced. A variable shunt reactor may continuously compensate reactive power as the load varies and thereby may secure voltage stability. A variable shunt reactor may reduce voltage jumps resulting from switching in and out traditional fixed shunt reactors.

According to yet another exemplary embodiment of the method the wind farm comprises a static synchronous compensator and the method further comprises compensating reactive power via the static synchronous compensator.

According to a second aspect, there is provided a wind farm controller adapted to perform the method according to any one of the embodiments as have been described hereinbefore.

According to a third aspect, there is provided a wind farm comprising a wind farm controller as has been introduced hereinbefore, a wind farm emergency generator and a first wind turbine, wherein the first wind turbine comprises a wind turbine transformer and a wind turbine converter.

According to a first embodiment the wind farm further comprises a second wind turbine and the first wind turbine comprises a wind turbine switch for connecting the second wind turbine.

According to a further embodiment the wind farm further comprises a shunt reactor, in particular a variable shunt reactor.

According to another embodiment the wind farm further comprises a static synchronous compensator.

According to a forth aspect, there is provided a computer-readable medium on which there is stored a computer program for processing a physical object, the computer program, when being executed by a data processor, is adapted for controlling and/or for carrying out the method as set forth above.

The computer-readable medium may be readably by a computer or a processor. The computer-readable medium may be, for example but not limited to, an electric, magnetic, optical, infrared or semiconductor system, device or transmission medium. The computer-readable medium may include at least one of the following media: a computer-distributable medium, a program storage medium, a record medium a computer-readable memory, a random access memory, an erasable programmable read-only memory, a computer-readable software distribution package, a computer-readable signal, a computer-readable telecommunications signal, computer-readable printed matter, and a computer-readable compressed software package.

According to a fifth aspect, there is provided a program element for processing a physical object, the program element, when being executed by a data processor, is adapted for controlling and/or carrying out the method as has been described above.

The program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The program element may be available from a network, such as the World Wide Web, from which it may be downloaded.

Embodiments of the present technique may be realized by means of a computer program respectively software. However, the embodiments may also be realized by means of one or more specific electronic circuits respectively hardware. Furthermore, the embodiments may also be realized in a hybrid form, i.e. in a combination of software modules and hardware modules.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF INVENTION

Figure 1:
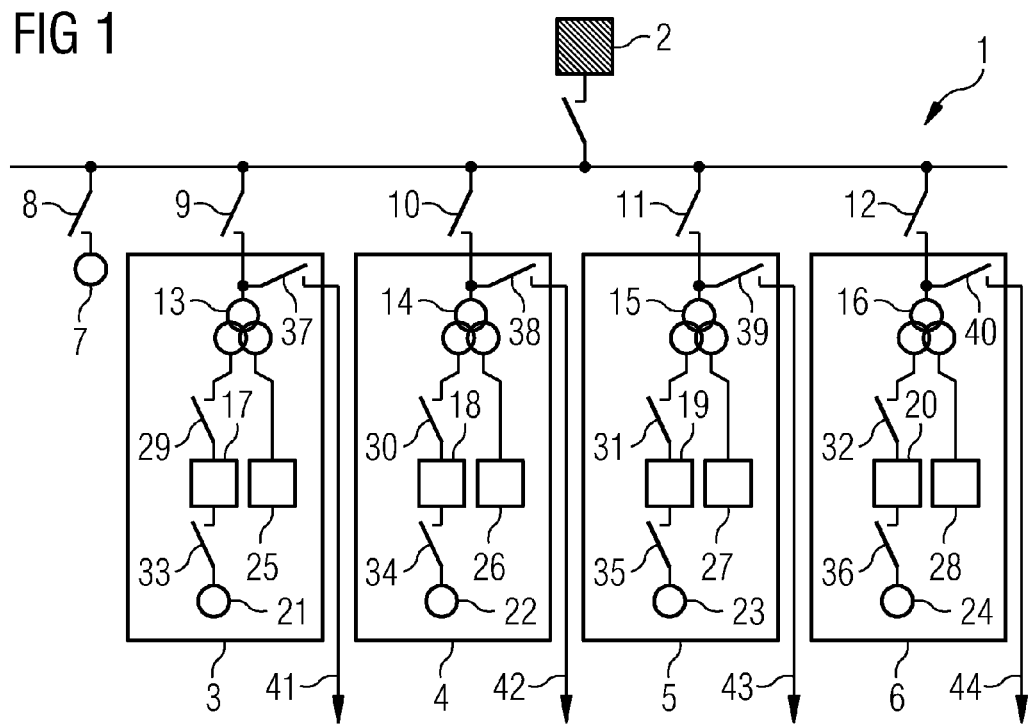
FIG. 1 shows an exemplary embodiment of a wind farm.

The illustration in the drawing is schematic.
FIG. 1 shows an exemplary embodiment of a wind farm 1 connected to a grid 2. The wind farm 1 comprises wind turbines 3, 4, 5 and 6 as well as a wind farm emergency generator 7, which are connectable via wind turbine switches 8, 9, 10, 11 and wind farm emergency generator switch 12, respectively, to the grid 2. However, the wind farm 1 may comprise more than the four wind turbines explicitly mentioned. Each wind turbine comprises a wind turbine transformer 13, 14, 15, 16, a wind turbine converter 17, 18, 19, 20, a wind turbine generator 21, 22, 23, 24, and auxiliary equipment 25, 26, 27, 28. The auxiliary equipment 25, 26, 27, 28 may, as shown in FIG. 1, be connected to the wind turbine transformer 13, 14, 15, 16 independently and galvanically isolated from the wind turbine converter 17, 18, 19, 20. The wind turbine converters 17, 18, 19, 20 may both be frequency converters for double fed and/or full scale generator systems.

Further, wind turbine converter switches 29, 30, 31, 32 and wind turbine generator switches 33, 34, 35, 36 are provided to connect the wind turbine converters 17, 18, 19, 20 to the wind turbine transformers 13, 14, 15, 16 and the wind turbine generators 21, 22, 23, 24 to the wind turbine converts 17, 18, 19, 20, respectively.

The wind turbines 3, 4, 5, 6 may furthermore comprise wind turbine switches 37, 38, 39, 40, which may be used to establish a connection to further wind turbines via cables 41, 42, 43, 44 leading to the next wind turbine on the respective radial.

Power has to be provided to the auxiliary equipment 25, 26, 27, 28 of the wind turbines 3, 4, 5, 6 even in case of a lost grid connection. Therefore the wind farm emergency generator 7 is provided. The wind farm emergency generator 7 is a synchronous generator, which in the case of an offshore wind farm may be placed on an offshore platform. Synchronous generators may provide active power with a constant frequency. In case of a lost grid connection the wind farm emergency generator 7 will supply the auxiliary equipment through the cables in the collector grid and the wind turbine transformers 13, 14, 15, 16.

Figure 2:
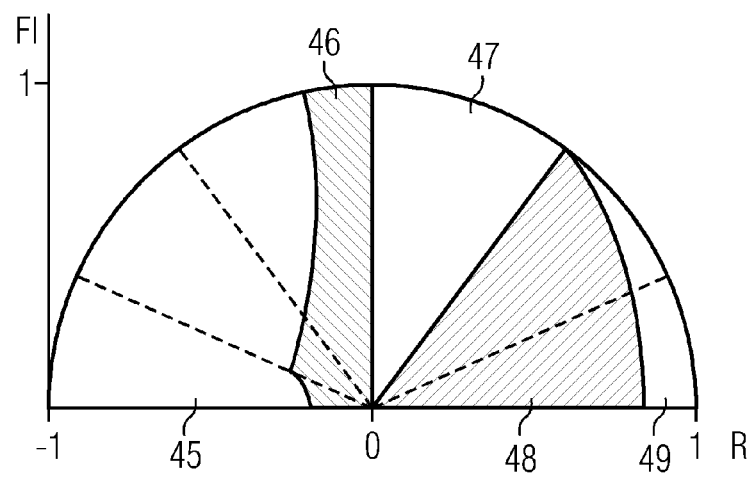
FIG. 2 shows a typical steady state alternator reactive power capability curve.

The active power a wind farm emergency generator may provide typically not only depends on the rated total power of the wind farm emergency generator but on the generated active power, too. FIG. 2 shows a typically power capability curve of a wind farm emergency generator, wherein the total power has been normalized to 1.

The x-axis shows the reactive power R. Negative values correspond to reactive power import, i.e. leading power factor, and positive values to exported reactive power, i.e. a lagging power factor. The active power A is shown on the y-axis.

A first, second, third, forth and fifth operating region 45, 46, 47, 48 and 49, respectively, may be distinguished. The first operating region should be avoided as voltage instabilities.

Operating the wind farm generator in the fifth operating region may result in overheating of the rotor of the wind farm emergency generator. Generally, the wind turbine emergency generator should be operated in the third operating region, i.e. the acceptable steady state operating region.

However, a wind farm emergency generator may consume/provide more reactive power for a transient event for some seconds. For example, for short time periods it may be operated in the second operating range 46 or in the forth operating range 48. As a rule of thumb, a wind farm emergency generator may carry up to 10 percent of its rated reactive power capability in lead power factor loads without being damaged or losing control of the output voltage. However, problems may arise if many such transient events happen fast after each other. This may result in an overheated generator. The most common sources of leading power factor are lightly loaded universal power system (UPS) with input filters and power factor correction devices for motors. Loading the wind farm emergency generator with lagging power factor loads prior to the leading power factor loads may improve stability.

Even in case of a lost grid connection the wind turbine transformers have to be energized. This may result in a high reactive inrush current, which may be several times higher than nominal current, due to the non-linear magnetic characteristic of wind turbine transformers.

According to the exemplary embodiment depicted in FIG. 1, in case of a lost connection to the grid 2, the wind farm emergency generator 7 will first be connected to wind turbine 3 and its wind turbine transformer 13 via wind turbine switch 8. The wind turbine emergency generator 7 may cope with the reactive power demand of the wind turbine transformer 13. Thus, the wind farm emergency generator 7 may supply the auxiliary equipment 25 of the wind turbine 3 via the wind turbine transformer 13.

The wind turbine converter 17 may then provide additional reactive power. Hence, further wind turbines, in particular wind turbines 9, 10 and 11, may be connected to the grid 2 via wind turbine switches 9, 10, 11 without overloading the wind farm emergency generator 7 with reactive power demands. The wind turbine converters 18, 19, 20 may then provide further reactive power such that wind turbine switches 37, 38, 39, 40 may be closed to connect cables 41, 42, 43, 44 leading to the next wind turbine on the respective radial.

In order to recapitulate the above-described embodiments one can state that a smaller wind farm emergency generator may be sufficient. This may be in particular desirable in case of offshore wind farms where limited place is available on the platforms.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method for controlling a wind farm when a connection to the grid is lost,
    wherein the wind farm comprises a wind farm emergency generator, and at least a first wind turbine, wherein the first wind turbine comprises a wind turbine transformer, a wind turbine converter and auxiliary equipment, wherein the method comprises:
    providing active power to the auxiliary equipment via the wind farm emergency generator, and
    providing reactive power via the wind turbine converter.

2. The method for controlling a wind farm as set forth in claim 1, wherein the wind farm further comprises a wind turbine switch for connecting a second wind turbine,
    wherein the method further comprises:
    closing the wind turbine switch for connecting the second wind turbine.

3. The method for controlling a wind farm as set forth in claim 2, wherein providing reactive power via the wind turbine converter comprises providing reactive power for energizing a wind turbine transformer of the second wind turbine.

4. The method for controlling a wind farm as set forth in claim 1, wherein providing active power to the auxiliary equipment via the wind farm emergency generator comprises ramping up slowly a wind farm emergency generator voltage from zero to nominal.

5. The method for controlling a wind farm as set forth in claim 1, the method further comprises,
    compensating reactive power via a shunt reactor.

6. The method for controlling a wind farm as set forth in claim 1, the method further comprises
    compensating reactive power via the static synchronous compensator.

* * * * *